US012785313B2

(12) United States Patent
Morinaga et al.

(10) Patent No.: US 12,785,313 B2
(45) **Date of Patent: *Nov. 3, 2026**

(54) TERMINAL MODULE WITH PARALLEL DIVIDED WALL PORTIONS

(71) Applicant: SUMITOMO WIRING SYSTEMS, LTD., Mie (JP)

(72) Inventors: Yosuke Morinaga, Mie (JP); Takayuki Uchiyama, Mie (JP); Akihito Maegawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 383 days.

This patent is subject to a terminal disclaimer.

(21) Appl. No.: 18/277,757

(22) PCT Filed: Sep. 7, 2021

(86) PCT No.: PCT/JP2021/032901

§ 371 (c)(1),
(2) Date: Aug. 17, 2023

(87) PCT Pub. No.: WO2022/185573

PCT Pub. Date: Sep. 9, 2022

(65) Prior Publication Data

US 2024/0128673 A1 Apr. 18, 2024

(30) Foreign Application Priority Data

Mar. 4, 2021 (JP) ................................ 2021-034045

(51) Int. Cl.
*H01R 13/24* (2006.01)
*H01R 13/15* (2006.01)

(52) U.S. Cl.
CPC ......... *H01R 13/2435* (2013.01); *H01R 13/15* (2013.01)

(58) Field of Classification Search
CPC ................ H01R 13/2435; H01R 13/15; H01R 4/4863; H01R 4/023
See application file for complete search history.

(56) References Cited

U.S. PATENT DOCUMENTS

2019/0013609 A1 1/2019 Kimura et al.
2019/0058274 A1 2/2019 Nishida et al.
(Continued)

FOREIGN PATENT DOCUMENTS

WO 2018/116964 A1 6/2018

OTHER PUBLICATIONS

International Search Report issued on Nov. 9, 2021 for WO 2022/185573 A1 (4 pages).

*Primary Examiner* — Travis S Chambers
(74) *Attorney, Agent, or Firm* — Venjuris, P.C.

(57) ABSTRACT

A terminal module includes a case having a pair of side walls, each provided with a first divided wall portion and a second divided wall portion that receive a terminal member. The first divided wall portions are parallel to each other, and the second divided wall portions are also parallel to each other. This configuration allows the terminal receiving portions to be formed without bending the case, thereby simplifying the manufacturing process. As a result, the terminal module achieves improved manufacturability and stable assembly of the terminal member within the case.

8 Claims, 8 Drawing Sheets

(56) References Cited

U.S. PATENT DOCUMENTS

| | | | | |
|---|---|---|---|---|
| 2019/0103695 | A1* | 4/2019 | Kimura | H01R 13/187 |
| 2020/0343665 | A1 | 10/2020 | Kimura et al. | |
| 2020/0373697 | A1 | 11/2020 | Nishijima | |
| 2021/0234296 | A1 | 7/2021 | Nishijima | |
| 2024/0055791 | A1* | 2/2024 | Morinaga | H01R 13/2421 |
| 2024/0136751 | A1* | 4/2024 | Morinaga | H01R 13/15 |

* cited by examiner

TERMINAL MODULE WITH PARALLEL DIVIDED WALL PORTIONS

CROSS REFERENCE TO RELATED APPLICATIONS

This application is a national phase of PCT application No. PCT/JP2021/032901, filed on 7 Sep. 2021, which claims priority from Japanese patent application No. 2021-034045, filed on 4 Mar. 2021, all of which are incorporated herein by reference.

TECHNICAL FIELD

The present disclosure relates to a terminal module.

BACKGROUND

Patent Document 1 discloses a terminal module in which a first terminal (electrical contact member) is attached to a case accommodating a coil spring. The first terminal is pressed by the coil spring. The first terminal is received by a part provided by bending a part of a side wall of the case.

PRIOR ART DOCUMENT

Patent Document

Patent Document 1: JP 2018-200777 A

SUMMARY OF THE INVENTION

The present disclosure is directed to a terminal module electrically connectable to a mating terminal member, the terminal module being provided with a resiliently deformable coil spring, a case for accommodating the coil spring, and a terminal member to be attached to the case, the coil spring including a first end part and a second end part arranged on a side opposite to the first end part, the case including a ceiling wall in contact with the first end part of the coil spring and a pair of side walls extending from the ceiling wall toward the second end part of the coil spring and facing each other, the terminal member including a first terminal to be attached to the pair of side walls and relatively movable with respect to the pair of side walls, each of the pair of side walls including a side wall base portion connected to the ceiling wall, a first divided wall portion connected to the side wall base portion and a second divided wall portion connected to the side wall base portion and separated from the first divided wall portion, the first divided wall portion including a first terminal receiving portion capable of receiving the first terminal pressed by the coil spring, the second divided wall portion including a second terminal receiving portion capable of receiving the first terminal pressed by the coil spring, the first terminal including a first surface to be pressed by the second end part of the coil spring, a second surface arranged on a side opposite to the first surface, a guided portion slidable with respect to the first divided wall portion, a first engaging portion engageable with the first divided wall portion and a second engaging portion engageable with the second divided wall portion, the first divided wall portions provided in the pair of respective side walls being parallel to each other, the second divided wall portions provided in the pair of respective side walls being parallel to each other, the first terminal being capable of reversibly taking a first position and a second position different from the first position, and, at the first position, the first surface being pressed by the coil spring, the guided portion being arranged between the first and second divided wall portions, the first engaging portion being engaged with the first terminal receiving portion and the second engaging portion being engaged with the second terminal receiving portion.

DETAILED DESCRIPTION TO EXECUTE THE INVENTION

Technical Problem

Figure 1:
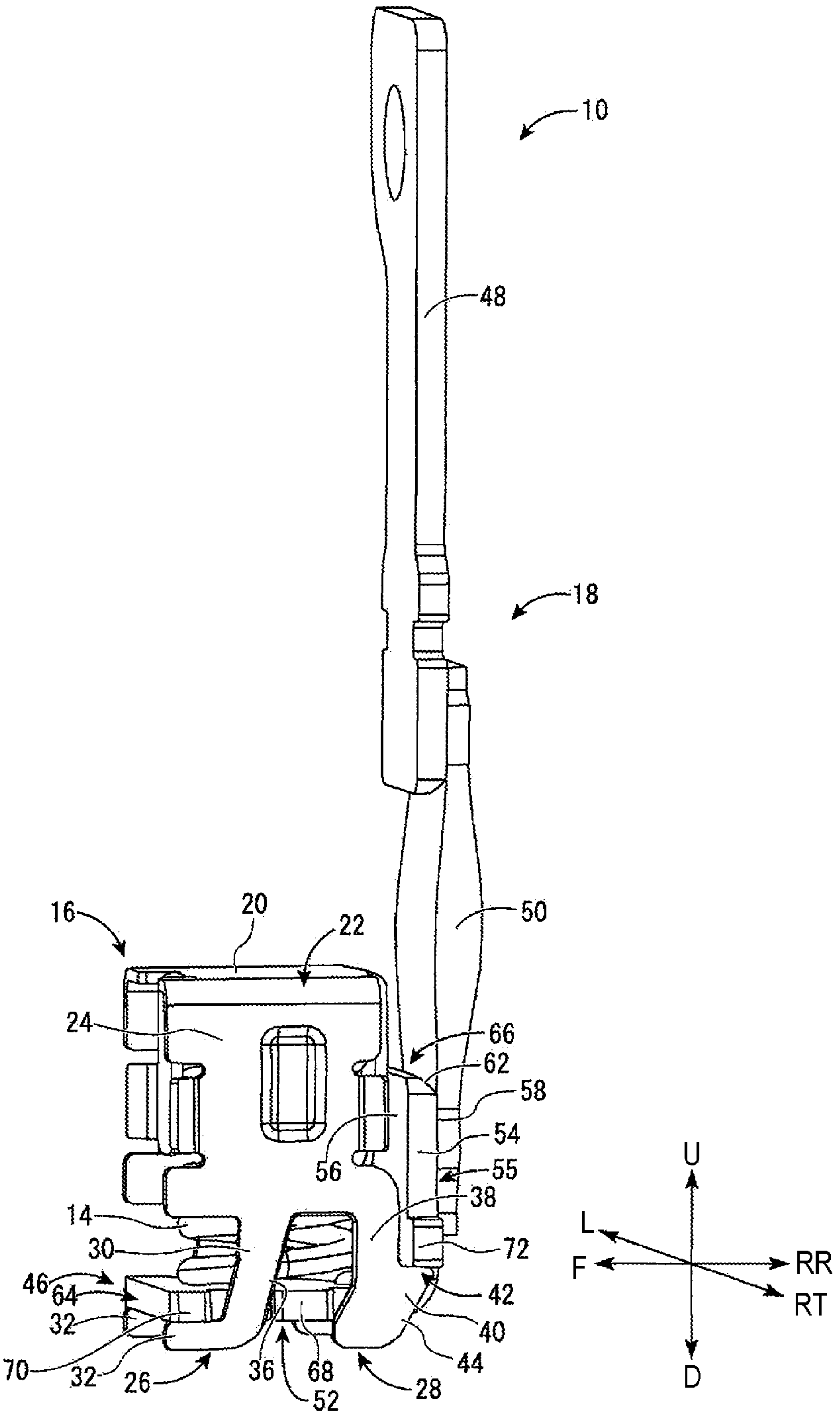
FIG. 1 is a perspective view showing a terminal module of an embodiment.

In the terminal module described in Patent Document 1, working man-hours for the case increase as compared to the case where the case is not bent. Thus, the terminal module has a room for further improvement in terms of improving manufacturability.

The present disclosure aims to provide a terminal module capable of improving manufacturability.

Effect of Invention

According to the terminal module of the present disclosure, an effect of being capable of improving manufacturability is achieved.

Description of Embodiments of Present Disclosure

First, embodiments of the present disclosure are listed and described.

(1) The terminal module of the present disclosure is electrically connectable to a mating terminal member and provided with a resiliently deformable coil spring, a case for accommodating the coil spring, and a terminal member to be attached to the case, the coil spring including a first end part and a second end part arranged on a side opposite to the first end part, the case including a ceiling wall in contact with the first end part of the coil spring and a pair of side walls extending from the ceiling wall toward the second end part of the coil spring and facing each other, the terminal member including a first terminal to be attached to the pair of side walls and relatively movable with respect to the pair of side walls, each of the pair of side walls including a side wall base portion connected to the ceiling wall, a first divided wall portion connected to the side wall base portion and a second divided wall portion connected to the side wall base portion and separated from the first divided wall portion, the first divided wall portion including a first terminal receiving portion capable of receiving the first terminal pressed by the coil spring, the second divided wall portion including a second terminal receiving portion capable of receiving the first terminal pressed by the coil spring, the first terminal including a first surface to be pressed by the second end part of the coil spring, a second surface arranged on a side opposite to the first surface, a guided portion slidable with respect to the first divided wall portion, a first engaging portion engageable with the first divided wall portion and a second engaging portion engageable with the second divided wall portion, the first divided wall portions provided in the pair of respective side walls being parallel to each other, the second divided wall portions provided in the pair of respective side walls being parallel to each other, the first terminal being capable of reversibly taking a first position and a second position different from the first position and, at the first position, the first surface being pressed by the coil spring, the guided portion being arranged between the first and second divided wall portions, the first engaging portion being engaged with the first terminal receiving portion and the second engaging portion being engaged with the second terminal receiving portion.

According to this configuration, each of the pair of side walls facing each other includes the first divided wall portion including the first terminal receiving portion capable of receiving the first terminal and the second divided wall portion including the second terminal receiving portion capable of receiving the first terminal. Further, the first divided wall portions provided in the pair of respective side walls are parallel to each other and the second divided wall portions provided in the pair of respective side walls are parallel to each other. Thus, a step of bending the case to provide the case with the first and second terminal receiving portions can be omitted. Therefore, the manufacturability of the terminal module can be improved.

(2) Preferably, the first terminal includes a pair of side surfaces at least partially facing the pair of side walls of the case, the guided portion projects from the pair of side surfaces, the first engaging portion projects from the pair of side surfaces, and the second engaging portion projects from the pair of side surfaces.

According to this configuration, the guided portion, the first engaging portion and the second engaging portion project from the pair of side surfaces. Thus, the guided portion, the first engaging portion and the second engaging portion can be provided in punching out the first terminal from a plate material by press-working, wherefore the first terminal needs not be bent. Therefore, the manufacturability of the terminal module can be improved.

Preferably, the first engaging portions project from the pair of respective side surfaces, and the second engaging portions project from the pair of respective side surfaces.

According to this configuration, the first engaging portions project from both of the pair of side surfaces of the first terminal. Thus, it is possible to suppress the inclination of the first terminal with respect to the case in rotating the first terminal after the first engaging portions are hooked to the first extending portions. Thus, the second engaging portions can be more easily engaged with the second divided wall portions. Therefore, the assembly workability of the terminal module can be improved. Further, the first and second engaging portions respectively project from both of the pair of side surfaces. Thus, the first terminal is received at least at four points by the case. Therefore, the detachment of the first terminal from the case can be suppressed as compared to the case where the first terminal is received at three points by the case. Consequently, the durability of the terminal module can be improved.

(4) Preferably, the first terminal includes a first terminal end part arranged closer to the guided portion than to the second engaging portion, and the first engaging portion is arranged on the first terminal end part.

According to this configuration, the first engaging portion is arranged on the first terminal end part. Thus, a projecting amount of the first terminal from the case can be suppressed as compared to the case where the first engaging portion is arranged between the first terminal end part and the guided portion. Therefore, the terminal module can be reduced in size.

(5) Preferably, the first divided wall portion includes a first base portion connected to the side wall base portion and a first extending portion extending from the first base portion toward a side opposite to the second divided wall portion, the first terminal receiving portion is arranged on the first extending portion, and the first engaging portion is engaged with the first terminal receiving portion from the side of the ceiling wall.

According to this configuration, the first terminal receiving portion is arranged on the first extending portion extending from the first base portion toward the side opposite to the second divided wall portion. Further, the first terminal receiving portion is so arranged that the first engaging portion is engaged therewith from the side of the ceiling wall. Thus, a worker can engage the second engaging portion with the second terminal receiving portion by rotating the first terminal with respect to the case after hooking the first engaging portion to the first extending portion. Therefore, the assembly workability of the terminal module can be improved.

(6) Preferably, the second divided wall portion includes a second base portion connected to the side wall base portion and a second extending portion extending from the second base portion toward a side opposite to the first divided wall portion, the second terminal receiving portion is arranged on the second extending portion, the second extending portion includes a second inclined portion inclined to approach the first divided wall portion toward a side opposite to the ceiling wall, and the second terminal receiving portion is closer to the ceiling wall than the second inclined portion.

According to this configuration, the second terminal receiving portion of the second divided wall portion is arranged closer to the ceiling wall than the second inclined portion of the second divided wall portion. Further, the second inclined portion is inclined to approach the first divided wall portion toward the side opposite to the ceiling wall. Thus, the second engaging portion of the first terminal can be suppressed from being caught by the second divided wall portion when the second engaging portion is moved around to the side closer to the ceiling wall than the second terminal receiving portion by rotating the first terminal about the first engaging portion with respect to the case. Therefore, the assembly workability of the terminal module can be improved.

(7) Preferably, the first terminal includes a first part to be brought into contact with the second end part of the coil spring and a second part connected to the first part and extending toward the ceiling wall of the case, the first engaging portion is arranged on the first part, the second engaging portion is arranged on the second part, and the second terminal receiving portion is closer to the ceiling wall than the first terminal receiving portion.

According to this configuration, the worker more easily engages the second engaging portion of the first terminal with the second terminal receiving portion of the case when attaching the first terminal to the case by rotating the first terminal. Therefore, the assembly workability of the terminal module can be improved.

(8) Preferably, the first terminal at the first position is capable of taking the second position by the second surface being pressed by a projecting portion provided on the mating terminal member and the guided portion of the first terminal sliding on the first divided wall portion of the case, and a position of the guided portion at the second position is closer to the ceiling wall and closer to the second terminal receiving portion in a direction orthogonal to an arrangement direction of the first end part of the coil spring and the second end part of the coil spring and a facing direction of the pair of side walls than that of the guided portion at the first position.

According to this configuration, the projecting portion of the mating terminal member relatively moves with respect to the second surface of the first terminal when the first terminal moves from the first position to the second position. Thus, even if an external matter adheres to the second surface of the first terminal before the first terminal and the mating terminal member are electrically connected, the projecting portion of the mating terminal member can wipe and remove the external matter adhering to the second surface of the first terminal. Therefore, it is possible to suppress an increase in contact resistance between the first terminal and the mating terminal member. Consequently, the heat generation of the terminal module 10 can be improved.

Details of Embodiment of Present Disclosure

A specific example of a terminal module of the present disclosure is described below with reference to the drawings. Note that the present disclosure is not limited to these illustrations, but is represented by claims and intended to include all changes in the scope of claims and in the meaning and scope of equivalents. In this specification, parallel does not mean parallel in a geometrically strict sense, but means a range to be regarded as parallel within a range in which effects of the present invention are achieved. Further, in this specification, orthogonal does not mean orthogonal in a geometrically strict sense, but means a range to be regarded as orthogonal within a range in which effects of the present invention are achieved. Further, for a plurality of identical members, only some members may be denoted by a reference sign, but the other members may not be denoted by the reference sign.

<Terminal Module 10>

Figure 2:
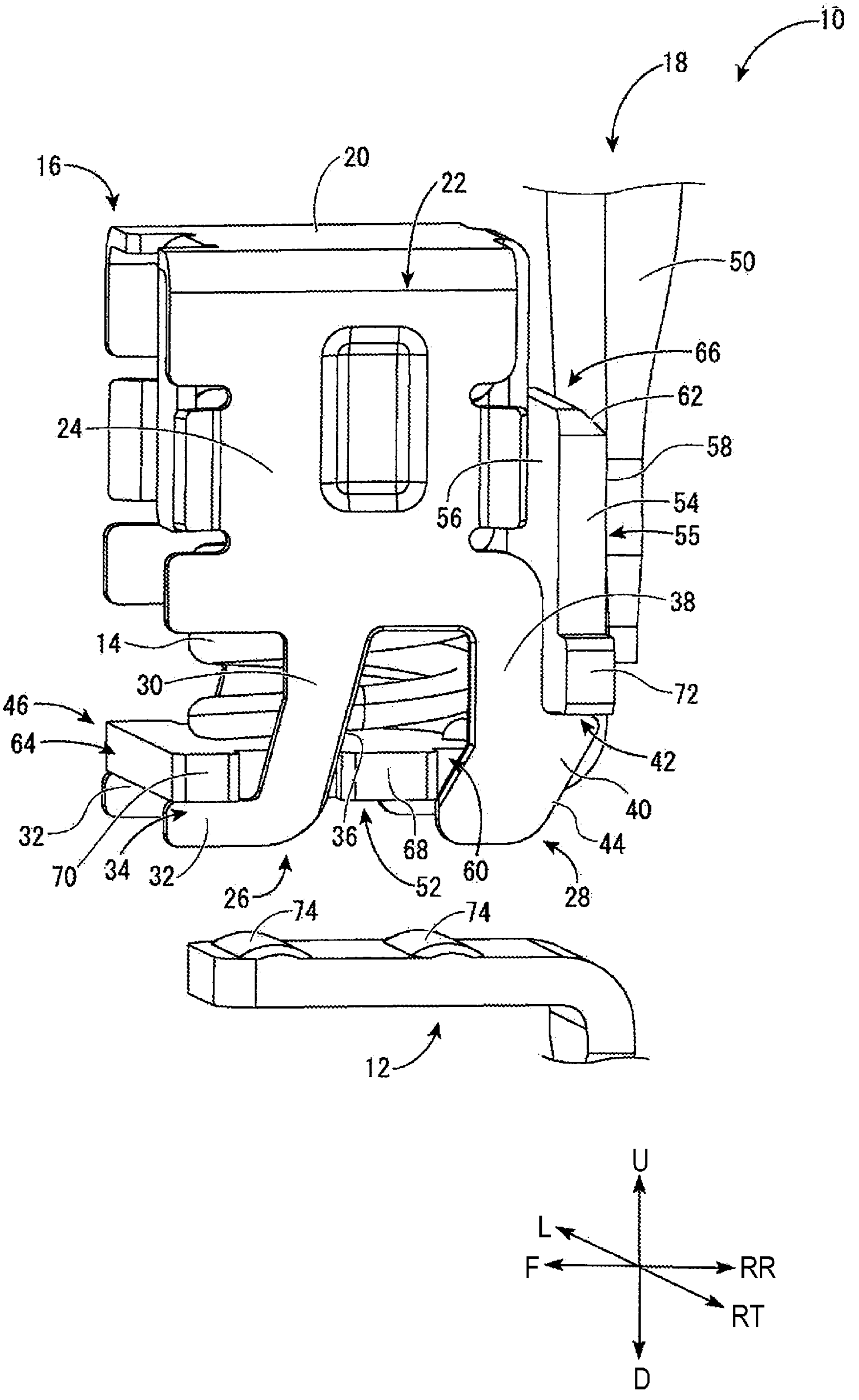
FIG. 2 is a perspective view showing the terminal module of the embodiment and a mating terminal member.
Figure 7:
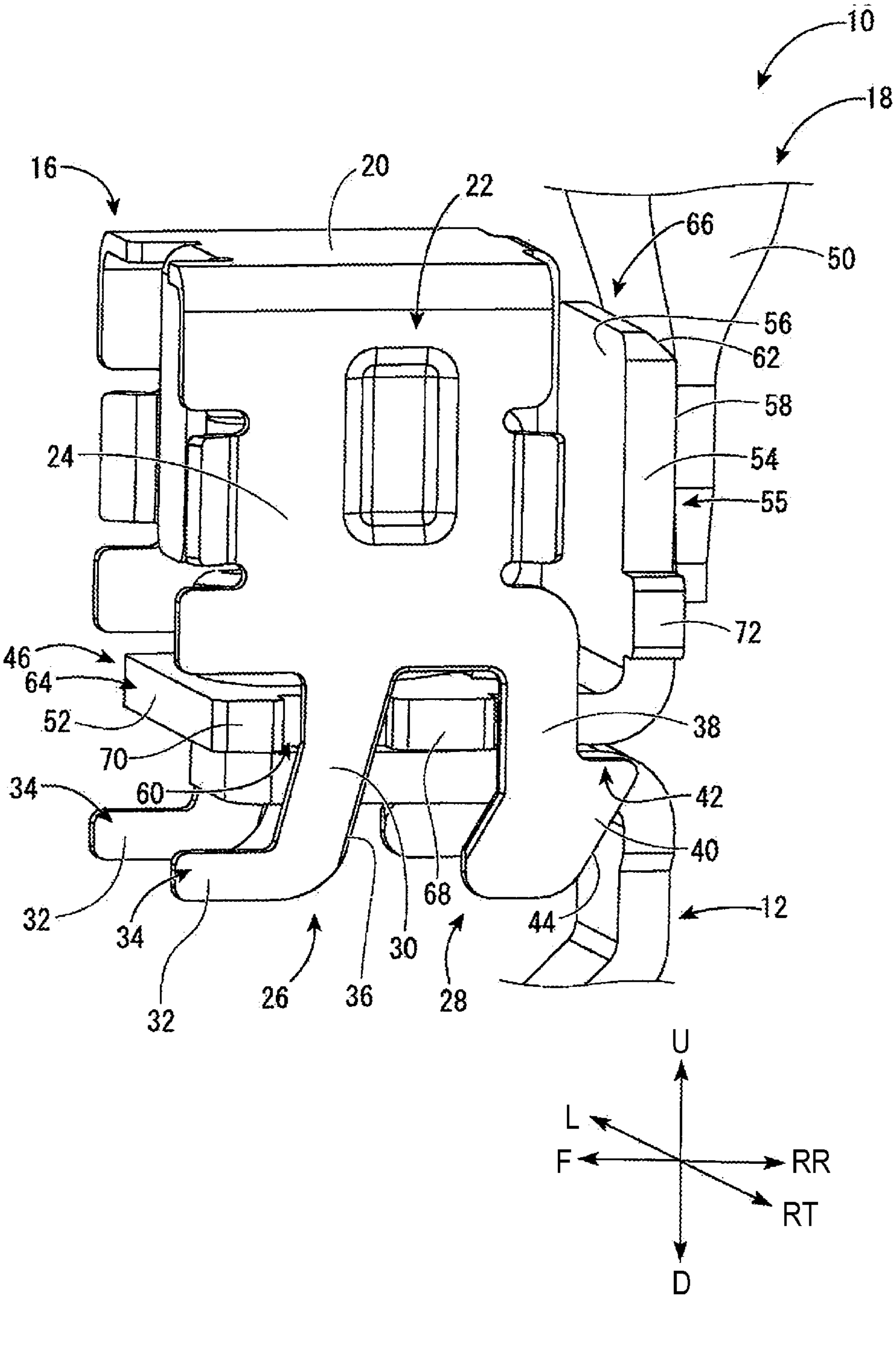
FIG. 7 is a perspective view showing the terminal module of the embodiment and the mating terminal member.

As shown in FIGS. 2 and 7, a terminal module 10 is electrically connectable to a mating terminal member 12. The terminal module 10 and the mating terminal member 12 are, for example, used to electrically connect a plurality of unillustrated in-vehicle devices. The terminal module 10 is, for example, held by an unillustrated connector housing. The terminal module 10 is, for example, mounted on an in-vehicle device via the connector housing. A battery pack, an inverter, a motor and the like can be, for example, cited as the in-vehicle devices. As shown in FIG. 1, the terminal module 10 is provided with a coil spring 14, a case 16 for accommodating the coil spring 14 and a terminal member 18 to be attached to the case 16.

<Terminal Member 18>

As shown in FIG. 1, the terminal member 18 includes a first terminal 46 to be electrically connected to the mating terminal member 12, a second terminal 48 to be electrically connected to an unillustrated external device and a flexible conductor 50 for electrically connecting the first and second terminals 46, 48. The first terminal 46 is attached to the case 16.

<Coil Spring 14>

Figure 3:
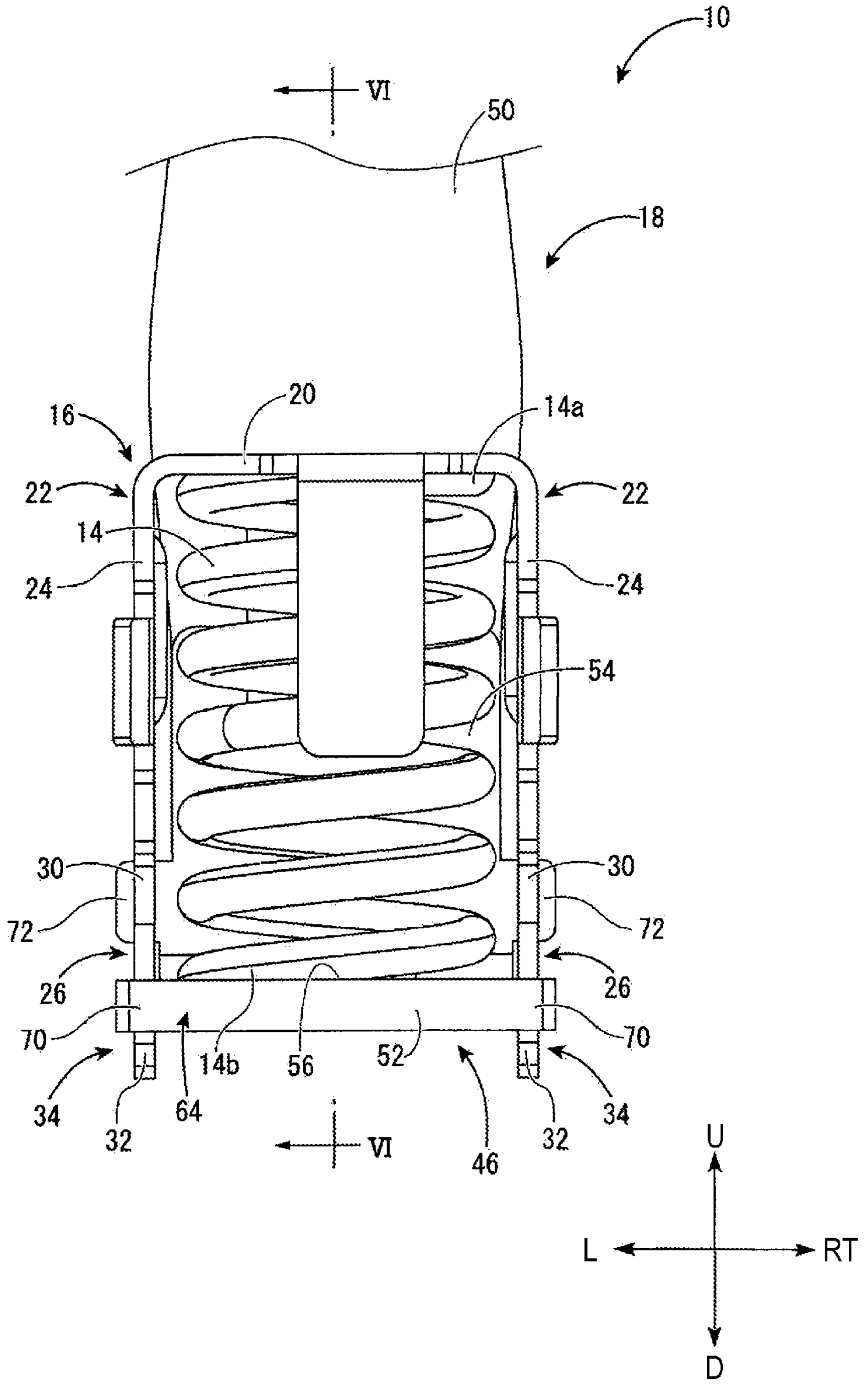
FIG. 3 is a front view showing the terminal module of the embodiment.
Figure 6:
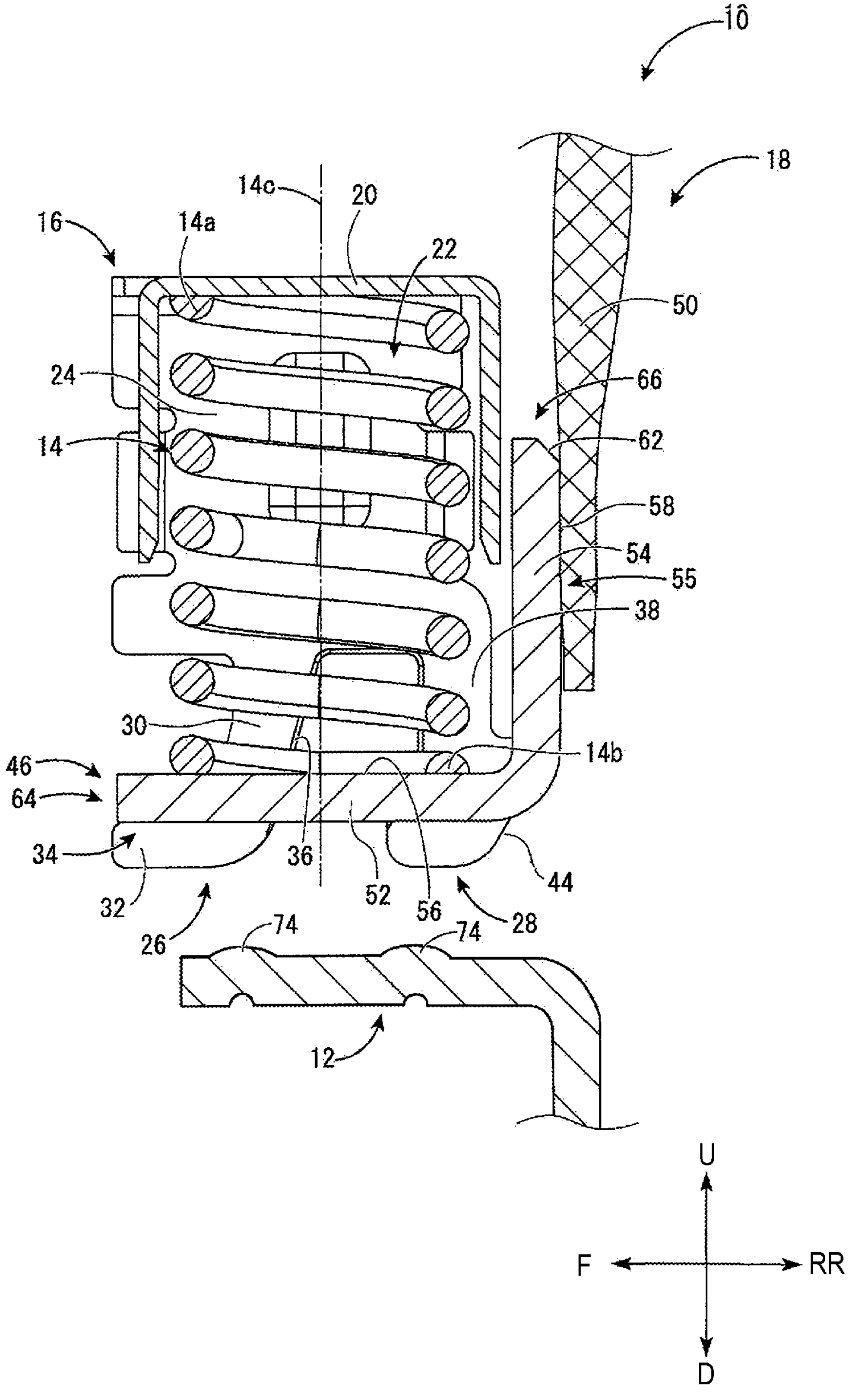
FIG. 6 is a section along VI-VI in FIG. 3.

The coil spring 14 is an example of a resiliently deformable resilient member. The coil spring 14 can be, for example, made of a metal material. As shown in FIGS. 3 and 6, the coil spring 14 is, for example, formed by winding a wire material about a center axis 14*c*. The coil spring 14 has a first end part 14*a* and a second end part 14*b*.

In the following description, a direction along the center axis 14*c* of the coil spring 14 is referred to as an axial direction of the coil spring 14 for the sake of convenience. The first end part 14*a* is an end part in the axial direction of the coil spring 14. The second end part 14*b* is an end part opposite to the first end part 14*a* in the axial direction. That is, the second end part 14*b* is arranged on a side opposite to the first end part 14*a* in the axial direction. The first and second end parts 14*a*, 14*b* are arranged along the axial direction of the coil spring. The coil spring 14 is resiliently deformable along the axial direction of the coil spring 14. The coil spring 14 is stretchable along the axial direction of the coil spring 14.

The first end part 14*a* is in contact with the case 16. The second end part 14*b* is in contact with the first terminal 46. The coil spring 14 is sandwiched by the case 16 and the first terminal 46. The coil spring 14 sandwiched by the case 16 and the first terminal 46 is shorter than a natural length of the coil spring 14. That is, the coil spring 14 sandwiched by the case 16 and the first terminal 46 is compressed in the axial direction. Therefore, the coil spring 14 presses the case 16 and presses the first terminal 46.

<Case 16>

Figure 4:
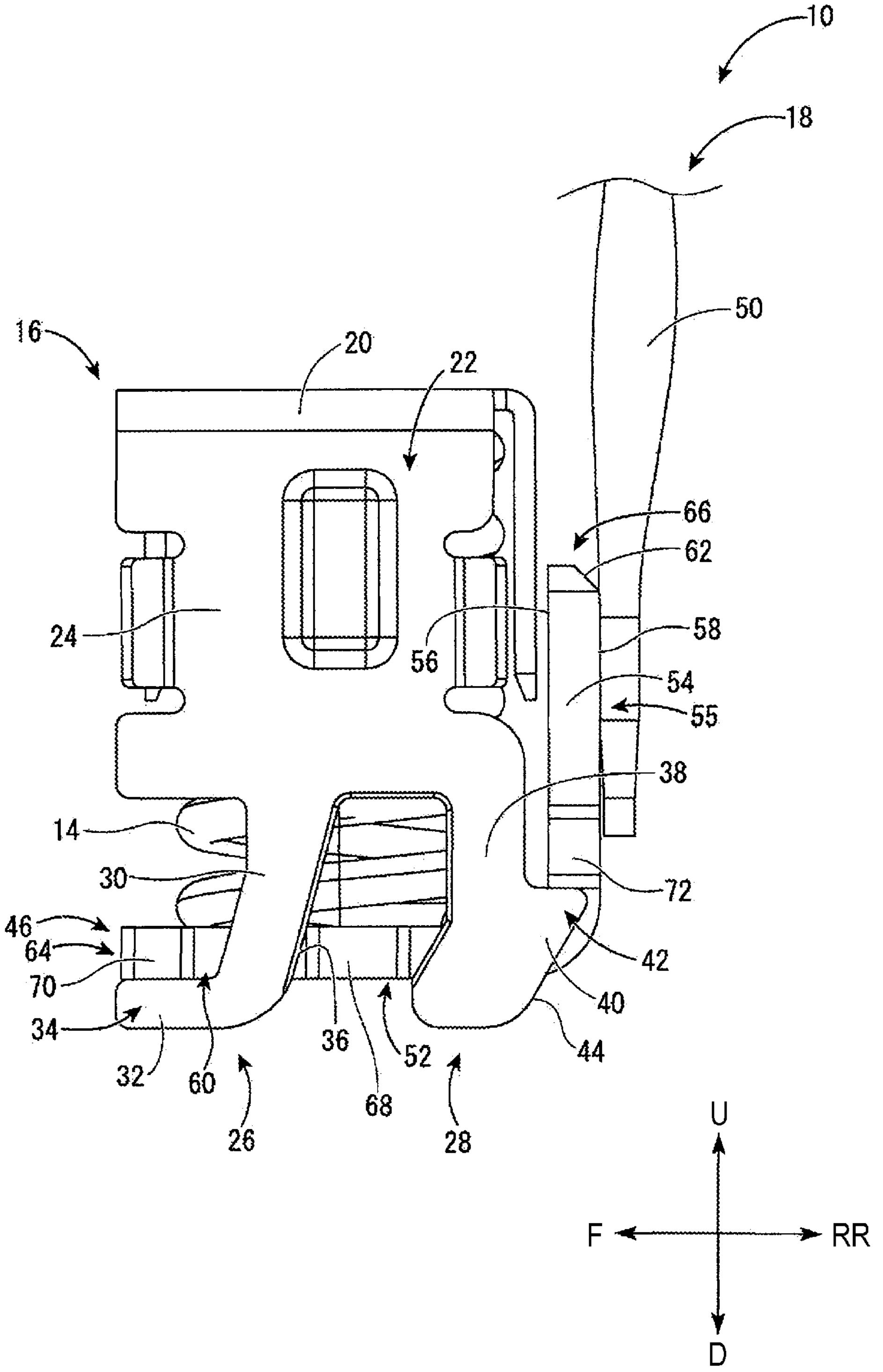
FIG. 4 is a right side view showing the terminal module of the embodiment.
Figure 5:
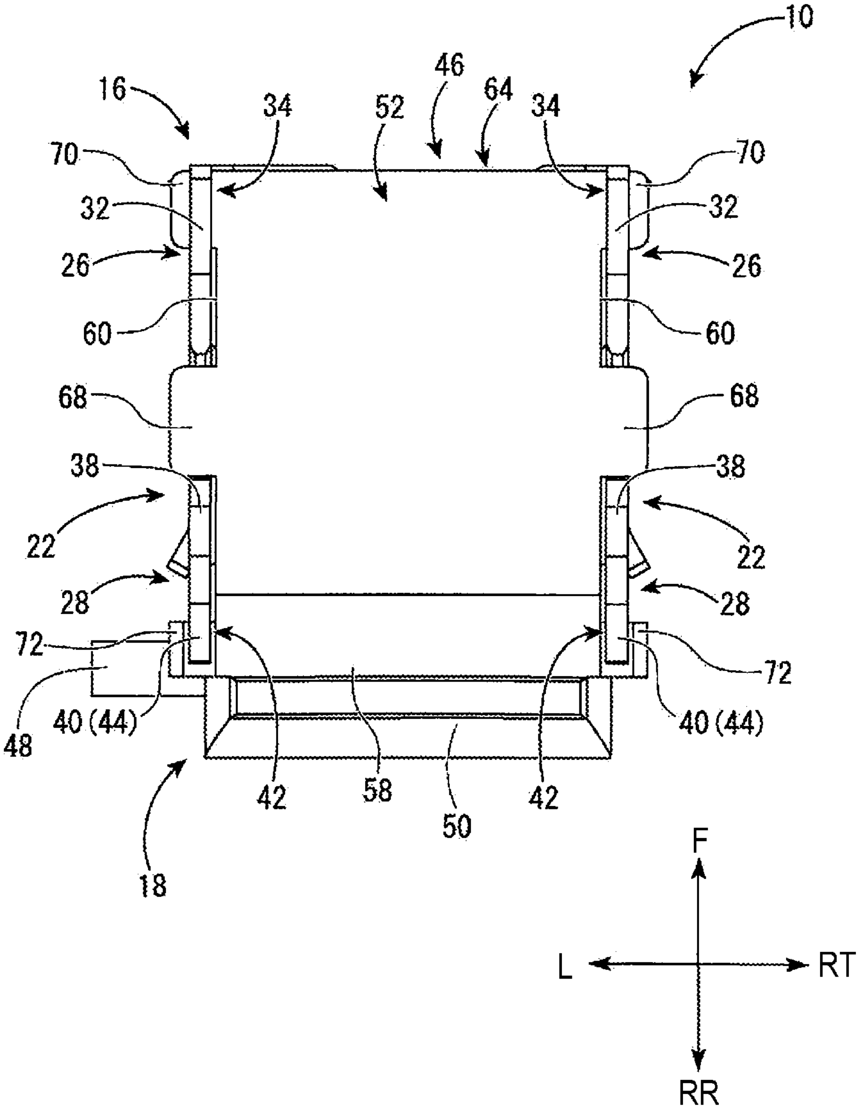
FIG. 5 is a bottom view showing the terminal module of the embodiment.

The case 16 can be, for example, made of a metal material such as stainless steel. The case 16 is, for example, formed into a predetermined shape by press-working. As shown in FIGS. 4 and 5, the case 16 includes a ceiling wall 20 and a pair of side walls 22, 22 extending from the ceiling wall 20. The ceiling wall 20 has, for example, a rectangular shape. The ceiling wall 20 is in contact with the first end part 14*a* of the coil spring 14. The pair of side walls 22, 22 extend from the ceiling wall 20 toward the second end part 14*b* of the coil spring 14. The pair of side walls 22, 22 extend, for example, along the axial direction of the coil spring 14. The pair of side walls 22, 22 are facing each other. The case 16 is, for example, open on a side opposite to the ceiling wall 20 in the axial direction of the coil spring 14. The first terminal 46 is attached to the pair of side walls 22, 22.

As shown in FIG. 4, each of the pair of side walls 22, 22 includes a side wall base portion 24 connected to the ceiling wall 20, a first divided wall portion 26 connected to the side wall base portion 24 and a second divided wall portion 28 connected to the side wall base portion 24 and separated from the first divided wall portion 26. The side wall base portion 24 has, for example, a rectangular shape. The first divided wall portion 26 extends from the side wall base portion 24 toward the second end part 14*b* of the coil spring 14. The second divided wall portion 28 extends from the side wall base portion 24 toward the second end part 14*b* of the coil spring 14. The first divided wall portion 26 is separated from the second divided wall portion 28 in a direction orthogonal to the axial direction of the coil spring 14 and a facing direction of the pair of side walls 22, 22.

In the following description, the axial direction of the coil spring 14 is referred to as a vertical direction for the sake of convenience. The facing direction of the pair of side walls 22, 22 is referred to as a lateral direction. The direction orthogonal to the axial direction of the coil spring 14 and the facing direction of the pair of side walls 22, 22 is referred to as a front-rear direction. In the following description, the side of the first end part 14*a* is referred to as an upper side and the side of the second end part 14*b* is referred to as a lower side in the vertical direction for the sake of convenience. The side of the first divided wall portion 26 is referred to as a front side and the side of the second divided wall portion 28 is referred to as a rear side in the front-rear direction.

As shown in FIG. 4, the first divided wall portion 26 extends, for example, downward from the lower end of the side wall base portion 24. The second divided wall portion 28 extends, for example, downward from the lower end of the side wall base portion 24. The first divided wall portion 26 is separated from the second divided wall portion 28 in the front-rear direction. The first divided wall portion 26 extends, for example, from an intermediate part in the front-rear direction on the lower end of the side wall base portion 24. The second divided wall portion 28 extends, for example, from a rear part in the front-rear direction on the lower end of the side wall base portion 24. The first divided wall portion 26 is located forward of the second divided wall portion 28. The rear end surface of the first divided wall portion 26 is facing the second divided wall portion 28. The first divided wall portion 26 is engageable with the first terminal 46.

The first divided wall portion 26 includes a first base portion 30 connected to the side wall base portion 24, a first extending portion 32 extending from the first base portion 30 toward a side opposite to the second divided wall portion 28, a first terminal receiving portion 34 and a first inclined portion 36 facing the second divided wall portion 28.

The first base portion 30 extends downward from the lower end of the side wall base portion 24. The first base portion 30 extends, for example, forward toward the lower side as a whole. The first base portion 30 includes, for example, a front end inclined forward toward the lower side. The first base portion 30 is located forward of the second divided wall portion 28. The rear end surface of the first base portion 30 is, for example, facing the second divided wall portion 28.

The first extending portion 32 extends forward from the first base portion 30. The first extending portion 32 extends, for example, forward from the lower end of the first base portion 30. The first extending portion 32 is, for example, engageable with the first terminal 46. The upper end of the first extending portion 32 is, for example, engageable with the first terminal 46. The upper end surface of the first extending portion 32 is, for example, engageable with the first terminal 46.

The first terminal receiving portion 34 can receive the first terminal 46 pressed downward by the coil spring 14. The first terminal receiving portion 34 is engageable with the first terminal 46 pressed downward by the coil spring 14. The first terminal receiving portion 34 is arranged on the first divided wall portion 26. The first terminal receiving portion 34 is, for example, arranged on the first extending portion 32. The first terminal receiving portion 34 is, for example, a part of an end surface facing toward the ceiling wall 20 in the first extending portion 32. The first terminal receiving portion 34 is, for example, a part of the upper end surface of the first extending portion 32.

The first inclined portion 36 is arranged on the rear end of the first divided wall portion 26. The first inclined portion 36 is, for example, a part of the rear end surface of the first divided wall portion 26. The first inclined portion 36 is, for example, arranged on the rear end of the first base portion 30. The first inclined portion 36 is, for example, a part of the rear end surface of the first base portion 30.

The first inclined portion 36 is inclined away from the second divided wall portion 28 toward a side opposite to the ceiling wall 20. That is, the first inclined portion 36 is inclined forward toward the lower side. The first inclined portion 36 is, for example, inclined away from the first extending portion 32 toward the ceiling wall 20. That is, the first inclined portion 36 is inclined rearward toward the upper side. The first inclined portion 36 is, for example, continuously inclined. The first inclined portion 36 is, for example, linearly inclined. The first inclined portion 36 is, for example, capable of contacting the first terminal 46.

As shown in FIGS. 3 and 5, the first divided wall portion 26 is provided in each of the pair of side walls 22, 22. A pair of the first divided wall portions 26, 26 are, for example, parallel to each other. A pair of the first base portions 30, 30 are, for example, parallel to each other. A pair of the first extending portions 32, 32 are, for example, parallel to each other.

As shown in FIG. 4, the second divided wall portion 28 includes a second base portion 38 connected to the side wall base portion 24, a second extending portion 40 extending from the second base portion 38 toward a side opposite to the first divided wall portion 26, a second terminal receiving portion 42 and a second inclined portion 44 inclined to approach the first divided wall portion 26 toward the side opposite to the ceiling wall 20.

The second base portion 38 extends downward from the lower end of the side wall base portion 24. An upper part of the second base portion 38 extends, for example, downward. A lower part of the second base portion 38 extends, for example, obliquely forward toward the lower side. The front end surface of the second base portion 38 is, for example, facing at least a part of the first terminal 46. The front end surface of the second base portion 38 is, for example, facing at least a part of the first base portion 30.

The second extending portion 40 extends rearward from the second base portion 38. The second extending portion 40 extends, for example, over the upper and lower parts of the second base portion 38. The second extending portion 40 extends, for example, further rearward than the side wall base portion 24. The upper end of the second extending portion 40 extends in the front-rear direction. The upper end of the second extending portion 40 is, for example, closer to the ceiling wall 20 than the upper end of the first extending portion 32. The upper end surface of the second extending portion 40 is, for example, located higher than that of the first extending portion 32. The second extending portion 40 is, for example, engageable with the first terminal 46. The upper end of the second extending portion 40 is, for example, engageable with the first terminal 46. The upper end surface of the second extending portion 40 is, for example, engageable with the first terminal 46.

The second terminal receiving portion 42 can receive the first terminal 46 pressed downward by the coil spring 14. The second terminal receiving portion 42 is engageable with the first terminal 46 pressed downward by the coil spring 14. The second terminal receiving portion 42 is arranged on the second divided wall portion 28. The second terminal receiving portion 42 is, for example, arranged on the second extending portion 40. The second terminal receiving portion 42 is, for example, a part of an end surface facing toward the ceiling wall 20 in the second extending portion 40. The second terminal receiving portion 42 is, for example, a part of the upper end surface of the second extending portion 40.

The second terminal receiving portion 42 is, for example, closer to the ceiling wall 20 than the first terminal receiving portion 34. The second terminal receiving portion 42 is, for example, located higher than the first terminal receiving portion 34.

The second inclined portion 44 is arranged on the second divided wall portion 28. The second inclined portion 44 is, for example, arranged on the second extending portion 40. The second inclined portion 44 is, for example, arranged on the rear end of the second extending portion 40. The second inclined portion 44 is, for example, a part of the rear end surface of the second extending portion 40. The second inclined portion 44 is inclined to approach the first divided wall portion 26 toward the side opposite to the ceiling wall 20. The second inclined portion 44 is inclined forward toward the lower side.

As shown in FIGS. 3 and 5, the second divided wall portion 28 is provided in each of the pair of side walls 22, 22. A pair of the second divided wall portions 28, 28 are, for example, parallel to each other. A pair of the second base portions 38, 38 are, for example, parallel to each other. A pair of the second extending portions 40, 40 are, for example, parallel to each other.

<First Terminal 46>

The first terminal 46 can be, for example, made of a metal material such as copper, copper alloy, aluminum or aluminum alloy. A plate member can be, for example, used as the first terminal 46. As shown in FIG. 2, the first terminal 46 is, for example, L-shaped when viewed from the lateral direction. The first terminal 46 is, for example, formed into a predetermined shape by press-working.

Figure 8:
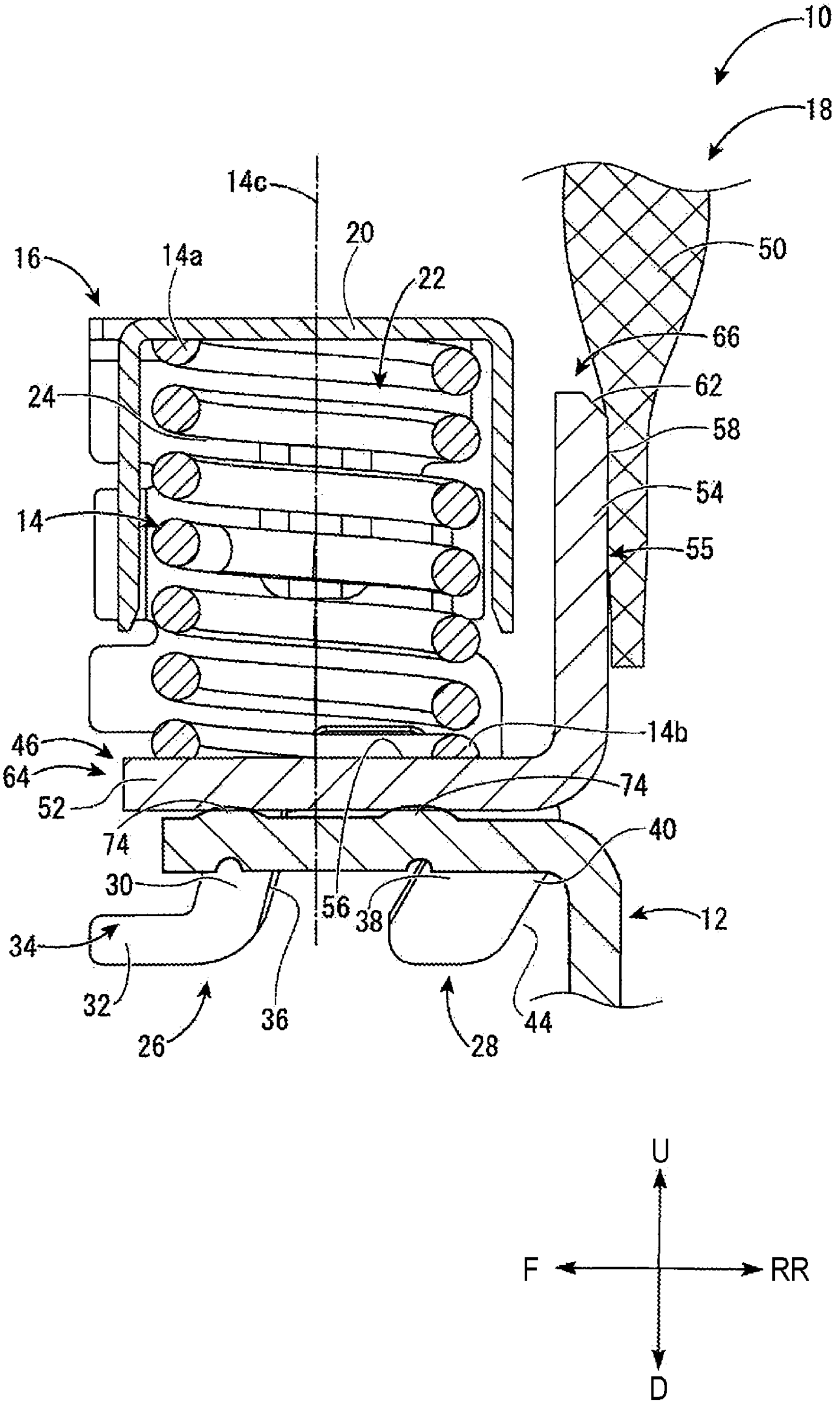
FIG. 8 is a longitudinal section showing the terminal module of the embodiment and the mating terminal member.

The first terminal 46 is attached to the pair of side walls 22, 22 of the case 16. The first terminal 46 is relatively movable with respect to the pair of side walls 22, 22. As shown in FIGS. 1 to 6, the first terminal 46 is pressed downward by the coil spring 14, whereby the first terminal 46 can take a first position to be engaged with the pair of side walls 22, 22. As shown in FIGS. 7 and 8, the first terminal 46 arranged at the first position is pressed upward by the mating terminal member 12, whereby the first terminal 46 can take a second position located higher than the first position.

The first terminal 46 arranged at the second position is pressed downward by the coil spring 14. The first terminal 46 located at the second position can take the first position again by moving the mating terminal member 12 downward. That is, the first terminal 46 can reversibly take the first and second positions in conformity with a mechanically connected state to the mating terminal member 12.

As shown in FIGS. 4 and 6, the first terminal 46 includes a first part 52, a second part 54 connected to the first part 52, a first surface 56, a second surface 58 arranged on a side opposite to the first surface 56, a pair of side surfaces 60, 60, a first terminal end part 64 and a second terminal end part 66 arranged on a side opposite to the first terminal end part 64. The first terminal 46 includes a joining portion 55 to be joined to the flexible conductor 50, a terminal inclined portion 62, guided portions 68, first engaging portions 70 and second engaging portions 72.

The first part 52 extends, for example, in the front-rear direction. The first part 52 is in contact with the second end part **14*b* of the coil spring 14. The first part 52 is, for example, engageable with the first divided wall portions 26. The first part 52 is, for example, arranged higher than the first extending portions 32. At least a part of the first part 52 is, for example, arranged inside the case 16. At least a part of the first part 52 is, for example, arranged between the pair of side walls 22, 22**.

The second part 54 is connected to the first part 52. The second part 54 extends, for example, from the first part 52 toward the ceiling wall 20. The second part 54 extends, for example, upward. For example, the second part 54 intersects the first part 52. The second part 54 is, for example, orthogonal to the first part 52. At least a part of the second part 54 is arranged outside the case 16.

The first surface 56 extends, for example, over the first and second parts 52, 54. The first surface 56 includes, for example, the upper surface of the first part 52 and the front surface of the second part 54. The first surface 56 in the first part 52 is in contact with the second end part **14*b* of the coil spring 14. The first surface 56 in the first part 52 is, for example, facing toward the ceiling wall 20 of the case 16. The first surface 56 in the second part 54 is, for example, facing toward the coil spring 14. The first surface 56 in the second part 54 is, for example, facing toward the side wall base portions 24 of the case 16. The first surface 56 in the second part 54 is, for example, facing toward the second divided wall portions 28 of the case 16**.

The second surface 58 is a surface opposite to the first surface 56. The second surface 58 extends, for example, over the first and second parts 52, 54. The second surface 58 includes, for example, the lower surface of the first part 52 and the rear surface of the second part 54. The second surface 58 in the second part 54 is, for example, joined to the flexible conductor 50. The second surface 58 in the second part 54 is, for example, arranged outside the case 16. The second surface 58 in the second part 54 is, for example, arranged behind the case 16.

At least parts of the pair of side surfaces 60, 60 are facing the pair of side walls 22, 22. One of the pair of side surfaces 60, 60 is, for example, facing leftward. The other of the pair of side surfaces 60, 60 is, for example, facing rightward. The pair of side surfaces 60, 60 extend, for example, over the first and second parts 52, 54. The pair of side surfaces 60, 60 include, for example, the left end surface of the first part 52 and the left end surface of the second part 54. The pair of side surfaces 60, 60 include, for example, the right end surface of the first part 52 and the right end surface of the second part 54. At least parts of the pair of side surfaces 60, 60 in the first part 52 are, for example, facing the first divided wall portions 26. At least parts of the pair of side surfaces 60, 60 in the first part 52 are, for example, facing the second divided wall portions 28.

The first terminal end part 64 is, for example, an end part located on a front side of the first part 52. The first terminal end part 64 is, for example, a front end part of the first terminal 46. The first terminal end part 64 is, for example, a front end part of the first part 52 of the first terminal 46.

The second terminal end part 66 is an end part located on a side opposite to the first terminal end part 64. The second terminal end part 66 is, for example, an end part located on the side opposite to the first terminal end part 64 in an extending direction of the first terminal 46. The second terminal end part 66 is, for example, an upper end part of the second part 54 of the first terminal 46. The second terminal end part 66 is, for example, located higher than the first terminal end part 64.

As shown in FIGS. 4 and 5, the guided portions 68 project from the pair of side surfaces 60, 60 of the first terminal 46. For example, the guided portions 68 respectively project from the pair of side surfaces 60, 60. The guided portion 68 projects, for example, leftward from one of the pair of side surfaces 60, 60. The guided portion 68 projects, for example, rightward from the other of the pair of side surfaces 60, 60. For example, the guided portion 68 projects further in the lateral direction than the first divided wall portion 26 when viewed from the vertical direction. For example, the guided portion 68 projects further in the lateral direction than the second divided wall portion 28 when viewed from the vertical direction.

The guided portions 68 are, for example, arranged on the first part 52 in the first terminal 46. The guided portions 68 are, for example, arranged between the first and second terminal end parts 64, 66. The guided portions 68 are, for example, arranged between the first and second engaging portions 70, 72 in the front-rear direction. The guided portions 68 are, for example, arranged between the first and second divided wall portions 26, 28 in the front-rear direction. The guided portions 68 are, for example, facing the rear end surfaces of the first divided wall portions 26. The guided portions 68 are, for example, facing the first inclined portions 36. The guided portions 68 are, for example, capable of contacting the first inclined portions 36. The guided portions 68 are, for example, facing the front end surfaces of the second divided wall portions 28.

The first engaging portions 70 can be received by the first terminal receiving portions 34 when the first terminal 46 is pressed downward by the coil spring 14. The first engaging portions 70 are engageable with the first terminal receiving portions 34 by the first terminal 46 being pressed downward by the coil spring 14. That is, when the first terminal 46 takes the first position, the first engaging portions 70 are engaged with the first terminal receiving portions 34.

The first engaging portions 70 project, for example, from the pair of side surfaces 60, 60 of the first terminal 46. The first engaging portions 70 project, for example, from the pair of respective side surfaces 60, 60. The first engaging portion 70 projects, for example, leftward from one of the pair of side surfaces 60, 60. The first engaging portion 70 projects, for example, rightward from the other of the pair of side surfaces 60, 60. As shown in FIG. 5, the first engaging portions 70 project, for example, further in the lateral direction than the side walls 22 when viewed from the vertical direction. The first engaging portions 70 project, for example, further in the lateral direction than the first divided wall portions 26. The first engaging portions 70 project, for example, further in the lateral direction than the first extending portions 32 when viewed from the vertical direction.

As shown in FIG. 4, the first engaging portion 70 is, for example, arranged on the first part 52 of the first terminal 46. The first engaging portion 70 is, for example, arranged on the first terminal end part 64. The first engaging portion 70 is, for example, arranged forward of the guided portion 68. The first engaging portion 70 is, for example, arranged forward of the second engaging portion 72. The first engaging portion 70 is, for example, arranged forward of the first base portion 30. The first engaging portion 70 is, for example, arranged higher than the first extending portion 32. The first engaging portion 70 is, for example, shorter than the first extending portion 32 in the front-rear direction.

The second engaging portions 72 can be received by the second terminal receiving portions 42 when the first terminal 46 is pressed downward by the coil spring 14. The second engaging portions 72 are engageable with the second terminal receiving portions 42 by the first terminal 46 being pressed downward by the coil spring 14. That is, when the first terminal 46 takes the first position, the second engaging portions 72 are engaged with the second terminal receiving portions 42.

The second engaging portions 72 project from the pair of side surfaces 60, 60 of the first terminal 46. The second engaging portions 72 project, for example, from the pair of respective side surfaces 60, 60. The second engaging portion 72 projects, for example, leftward from one of the pair of side surfaces 60, 60. The second engaging portion 72 projects, for example, rightward from the other of the pair of side surfaces 60, 60. As shown in FIG. 5, the second engaging portions 72 project, for example, further in the lateral direction than the side walls 22 when viewed from the vertical direction. The second engaging portions 72 project, for example, further in the lateral direction than the second divided wall portions 28 when viewed from the vertical direction. The second engaging portions 72 project, for example, further in the lateral direction than the second extending portions 40 when viewed from the vertical direction.

As shown in FIG. 4, the second engaging portion 72 is, for example, arranged on the second part 54 in the first terminal 46. The second engaging portion 72 is, for example, arranged between the guided portion 68 and the second terminal end part 66 in the extending direction of the first terminal 46. The second engaging portion 72 is, for example, arranged higher than the first engaging portion 70. The second engaging portion 72 is, for example, arranged lower than the joining portion 55. The second engaging portion 72 is, for example, arranged behind the second base portion 38. The second engaging portion 72 is, for example, arranged higher than the second extending portion 40.

The joining portion 55 is a part of the first terminal 46 joined to the flexible conductor 50. The joining portion 55 is, for example, arranged on the second surface 58 in the second part 54. The joining portion 55 is, for example, arranged between the second terminal end part 66 and the second engaging portions 72. The joining portion 55 is, for example, at a position closer to the ceiling wall 20 of the case 16 than the second engaging portions 72. The joining portion 55 is, for example, arranged higher than the second engaging portions 72. The joining portion 55 is arranged outside the case 16 when viewed from the facing direction of the pair of side walls 22, 22 of the case 16. The joining portion 55 is, for example, arranged behind the case 16 when viewed from the lateral direction. The joining portion 55 is, for example, arranged behind the side wall base portions 24 of the case 16 when viewed from the lateral direction.

The terminal inclined portion 62 is arranged on the second surface 58 in the second part 54. The terminal inclined portion 62 is inclined to approach the first surface 56 toward the side opposite to the first part 52 in the extending direction of the first terminal 46. The terminal inclined portion 62 is, for example, arranged closer to the ceiling wall 20 than the joining portion 55. The terminal inclined portion 62 is arranged closer to the second terminal end part 66 than the joining portion 55. The terminal inclined portion 62 is, for example, arranged higher than the joining portion 55. The terminal inclined portion 62 is, for example, arranged on the second terminal end part 66. The terminal inclined portion 62 is capable of facing the flexible conductor 50 in the front-rear direction.

<Second Terminal 48>

As shown in FIG. 1, the second terminal 48 can be, for example, made of a metal material. The second terminal 48 is, for example, plate-like. The second terminal 48 is, for example, formed into a predetermined shape by press-working. The flexible conductor 50 is joined to one end part of the second terminal 48. The other end part of the second terminal 48 is electrically connectable to an unillustrated external device. The second terminal 48 is, for example, held at a position higher than the first terminal 46 by the unillustrated connector housing.

<Flexible Conductor 50>

The flexible conductor 50 is a conductor having flexibility. The flexible conductor 50 is a conductor higher in flexibility than the first terminal 46. The flexible conductor 50 is a conductor higher in flexibility than the second terminal 48. The flexible conductor 50 is, for example, repeatedly deformable.

The flexible conductor 50 is joined to the first and second terminals 46, 48. The flexible conductor 50 is joined to the first and second terminals 46, 48 by a known technique such as welding. The flexible conductor 50 is electrically connected to the first terminal 46. The flexible conductor 50 is electrically connected to the second terminal 48.

The flexible conductor 50 is, for example, a braided member formed by braiding a plurality of metal wires. The braided member is, for example, braided into a tubular shape. The outer peripheral surface of the braided member is, for example, joined to the first and second terminals 46, 48.

<Mating Terminal Member 12>

The mating terminal member 12 can be, for example, made of a metal material. A plate member can be, for example, used as the mating terminal member 12. The mating terminal member 12 is, for example, L-shaped. The mating terminal member 12 includes, for example, projecting portions 74 on a surface facing the second surface 58 of the first terminal 46. The projecting portions 74 project, for example, toward the second surface 58 of the first terminal 46. A pair of the projecting portions 74 are, for example, provided. The mating terminal member 12 is, for example, formed into a predetermined shape by press-working. The mating terminal member 12 can be electrically connected to the first terminal 46 by contacting the first terminal 46. More particularly, the mating terminal member 12 can be electrically connected to the first terminal 46 by the projecting portions 74 of the mating terminal member 12 contacting the second surface 58 of the first terminal 46. When the first terminal 46 moves from the first position to the second position, the projecting portions 74 of the mating terminal member 12 rub against the second surface 58 of the first terminal 46.

<First Position of First Terminal 46 and Second Position of First Terminal 46>

As shown in FIGS. 2 to 6, the first terminal can take the first position. As shown in FIGS. 7 and 8, the first terminal 46 can take the second position. For example, the first terminal 46 can reversibly take the first and second positions in conformity with the electrically connected state to the mating terminal member 12. As shown in FIG. 2, the first terminal 46 takes the first position, for example, before being electrically connected to the mating terminal member 12. As shown in FIG. 7, the first terminal 46 takes the second position, for example, when being electrically connected to the mating terminal member 12. As shown in FIG. 2, the first terminal 46 takes the first position, for example, when being electrically disconnected from the mating terminal member 12.

As shown in FIGS. 2 and 7, the first terminal 46 can reversibly take the first and second positions, for example, in conformity with the mechanically connected state to the mating terminal member 12. The first terminal 46 takes the first position, for example, before being mechanically connected to the mating terminal member 12. The first terminal 46 takes the second position, for example, when being mechanically connected to the mating terminal member 12. The first terminal 46 takes the first position, for example, when being mechanically disconnected from the mating terminal member 12.

As shown in FIG. 4, the first terminal 46 can take the first position by being pressed downward by the coil spring 14. The guided portions 68 at the first position are arranged between the first and second divided wall portions 26, 28.

At the first position, the first engaging portions 70 of the first terminal 46 are engaged with the first terminal receiving portions 34. At the first position, the first engaging portions 70 are, for example, engaged with the first divided wall portions 26. At the first position, the first engaging portions 70 are, for example, engaged with the first extending portions 32.

At the first position, the second engaging portions 72 of the first terminal 46 are engaged with the second terminal receiving portions 42. At the first position, the second engaging portions 72 are, for example, engaged with the second divided wall portions 28. At the first position, the second engaging portions 72 are, for example, engaged with the second extending portions 40. Thus, at the first position, the first terminal 46 is, for example, sandwiched by the case 16 and the coil spring 14.

At the first position, the joining portion 55 is arranged outside the case 16 when viewed from the facing direction of the pair of side walls 22, 22 of the case 16. At the first position, the joining portion 55 is arranged behind the case 16 when viewed from the lateral direction. At the first position, the joining portion 55 is arranged behind the side wall base portions 24 of the case 16 when viewed from the lateral direction.

As shown in FIGS. 7 and 8, the first terminal 46 at the first position is pressed toward the ceiling wall 20 by the mating terminal member 12, whereby the first terminal 46 can take the second position. When the first terminal 46 moves from the first position to the second position, the guided portions 68 of the first terminal 46 slide along the first inclined portions 36. That is, the guided portions 68 are guided by the first inclined portions 36. Therefore, when the first terminal 46 moves from the first position to the second position, a moving direction of the first terminal 46 is restricted by the first inclined portions 36.

The first inclined portions 36 are, for example, inclined away from the first extending portions 32 toward the ceiling wall 20. The first terminal 46 is pressed toward the ceiling wall 20 by the mating terminal member 12, whereby the guided portions 68 are guided by the first inclined portions 36 to be more separated from the first extending portions 32 toward the ceiling wall 20. That is, the guided portions 68 are guided by the first inclined portions 36 to move rearward toward the upper side. Therefore, the guided portions 68 of the first terminal 46 at the second position are located upwardly and rearwardly of the guided portions 68 of the first terminal 46 at the first position. That is, the first terminal 46 moves upward and rearward by being pressed upward by the mating terminal member 12.

The guided portions 68 project further in the lateral direction than the first divided wall portions 26 when viewed from the vertical direction. Further, the guided portions 68 project further in the lateral direction than the second divided wall portions 28 when viewed from the vertical direction. Thus, the inclination of the first terminal 46 can be suppressed when the first terminal 46 moves from the first position to the second position as compared to the case where the first terminal 46 includes only one guided portion 68. Therefore, a reduction in the contact area of the first terminal 46 and the mating terminal member 12 can be suppressed, and an increase in contact resistance between the first terminal 46 and the mating terminal member 12 can be suppressed. Consequently, the heat generation of the terminal module 10 can be suppressed.

At the second position, the first engaging portions 70 of the first terminal 46 are separated from the first terminal receiving portions 34. That is, at the second position, the first engaging portions 70 are disengaged from the first terminal receiving portions 34. At the second position, the second engaging portions 72 of the first terminal 46 are separated from the second terminal receiving portions 42. That is, at the second position, the second engaging portions 72 are disengaged from the second terminal receiving portions 42. Therefore, at the second position, the first terminal 46 is, for example, sandwiched by the coil spring 14 and the mating terminal member 12.

At the second position, the joining portion 55 of the first terminal 46 joined to the flexible conductor 50 is located outside the case 16 when viewed from the lateral direction. That is, the joining portion 55 is located behind the case 16. As shown in FIGS. 6 and 8, the joining portion 55 at the second position is more separated from the case 16 than the joining portion 55 at the first position. That is, the joining portion 55 at the second position is located rearward of the joining portion 55 at the first position.

The first terminal 46 at the second position is pressed downward by the coil spring 14. The first terminal 46 at the second position is supported from below by the mating terminal member 12. That is, the first terminal 46 at the second position is suppressed from moving downward by the mating terminal member 12. Therefore, if the mating terminal member 12 is moved downward, the first terminal 46 moves downward from the second position.

If the mating terminal member 12 continues to be moved downward, the first terminal 46 is engaged with the case 16 and a downward movement thereof is stopped. More particularly, the first engaging portions 70 of the first terminal 46 are engaged with the first terminal receiving portions 34 of the case 16. The second engaging portions 72 of the first terminal 46 are engaged with the second terminal receiving portions 42 of the case 16. That is, the first terminal 46 takes the first position again. Therefore, the first terminal 46 can reversibly take the first and second positions.

When the first terminal 46 reversibly moves between the first and second positions, the flexible conductor 50 can be deformed according to a movement of the first terminal 46. That is, the first terminal 46 can reversibly take the first and second positions by the deformation of the flexible conductor 50. The flexible conductor 50 is pushed and deflected by the first terminal 46, for example, when the first terminal 46 moves from the first position to the second position. Thus, the terminal module 10 can deal with a distance reduction between the first and second terminals 46, 48. Further, the flexible conductor 50 is pulled and stretched, for example, when the first terminal 46 moves from the second position to the first position. Therefore, the terminal module 10 can deal with a distance increase between the first and second terminals 46, 48.

<Assembly Method of Terminal Module 10>

The terminal module 10 is, for example, assembled as follows. First, the case 16 formed into a predetermined shape is prepared. Subsequently, the flexible conductor 50 is joined to the first and second terminals 46, 48 to prepare the terminal member 18. Subsequently, the coil spring 14 is accommodated into the case 16. Subsequently, the first engaging portions 70 of the first terminal 46 are hooked on the upper end surfaces of the first extending portions 32 of the first divided wall portions 26. In this state, the first engaging portions 70 are located higher than the first extending portions 32. The guided portions 68 are located lower than the first extending portions 32.

Subsequently, the first terminal 46 is pushed toward the ceiling wall 20 of the case 16 and rotated with respect to the case 16. A rotating direction of the first terminal 46 is, for example, a counterclockwise direction in FIG. 4. The first terminal 46 is, for example, rotated about the first engaging portions 70 with respect to the case 16. At this time, the coil spring 14 accommodated in the case 16 is compressed in the vertical direction by the first terminal 46. The guided portions 68 of the first terminal 46 enter between the first and second divided wall portions 26, 28. The second engaging portions 72 of the first terminal 46 move around to be located above the second terminal receiving portions 42 of the second extending portions 40. Since the second inclined portions 44 provided on the second divided wall portions 28 are inclined, the second engaging portions 72 easily move around to be located above the second terminal receiving portions 42. That is, the second inclined portions 44 suppresses the second engaging portions 72 from being caught by the second divided wall portions 28.

With the first and second engaging portions 70, 72 respectively located above the first and second terminal receiving portions 34, 42, a distance between the ceiling wall 20 and the first terminal 46 in the vertical direction is shorter than the natural length of the coil spring 14. That is, in this state, the coil spring 14 is compressed in the vertical direction by the ceiling wall 20 and the first terminal 46. Since a vertical restoring force is generated in the coil spring 14 in this state, the first surface 56 of the first terminal 46 is pressed downward by the second end part **14*b* of the coil spring 14 after the second engaging portions 72 move around to be located above the second terminal receiving portions 42. As a result, the first engaging portions 70 of the first terminal 46 are engaged with the first terminal receiving portions 34** from above.

The second engaging portions 72 of the first terminal 46 are engaged with the second terminal receiving portions 42 from above. That is, the first and second engaging portions 70, 72 are respectively received by the first and second terminal receiving portions 34, 42. By the engagement of the case 16 and the first terminal 46 as described above, the terminal module 10 is completed. Note that the first terminal 46 of the assembled terminal module 10 takes the first position.

In the assembled terminal module 10, a distance between the ceiling wall 20 and the first part 52 of the first terminal 46 is shorter than the natural length of the coil spring 14. Thus, the first engaging portions 70 are pressed against the first terminal receiving portions 34 by the coil spring 14. The second engaging portions 72 are pressed against the second terminal receiving portions 42 by the coil spring 14. An engaged state of the case 16 and the first terminal 46 is maintained by the coil spring 14. That is, the first terminal 46 of the terminal module 10 can maintain the first position, for example, until being connected to the mating terminal member 12.

Note that the terminal module 10 may be completed by connecting the flexible conductor 50 and the second terminal 48 to the first terminal 46 after the first terminal 46 is assembled with the case 16.

Next, functions and effects of this embodiment are described.

(1) The respective first divided wall portions 26 of the pair of side walls 22, 22 are parallel to each other. The first terminal receiving portions 34 to be engaged with the first engaging portions 70 of the first terminal 46 are arranged on the first divided wall portions 26. Further, the respective second divided wall portions 28 of the pair of side walls 22, 22 are parallel to each other. The second terminal receiving portions 42 to be engaged with the second engaging portions 72 of the first terminal 46 are arranged on the second divided wall portions 28. Thus, a step of bending the case 16 to provide the case 16 with the first and second terminal receiving portions 34, 42 can be omitted. Therefore, the manufacturability of the terminal module 10 can be improved.

(2) The guided portions 68, the first engaging portions 70 and the second engaging portions 72 project from the pair of side surfaces 60, 60 of the first terminal 46. Thus, the first terminal 46 can be provided with the guided portions 68, the first engaging portions 70 and the second engaging portions 72 in punching out the first terminal 46 from a plate material by press-working. Therefore, a step of bending the case 16 to provide the case 16 with the guided portions 68, the first engaging portions 70 and the second engaging portions 72 can be omitted. Consequently, the manufacturability of the terminal module 10 can be improved.

(3) The first engaging portions 70 project from both of the pair of side surfaces 60 of the first terminal 46. Thus, it is possible to suppress the inclination of the first terminal 46 with respect to the case 16 in engaging the second engaging portions 72 with the second divided wall portions 28 by hooking the first engaging portions 70 to the first extending portions 32 and rotating the first terminal 46. Thus, the assembly workability of the terminal module 10 can be improved. Further, the first and second engaging portions 70, 72 respectively project from both of the pair of side surfaces 60, 60. Thus, the first terminal 46 is received at least at four points by the case 16. Therefore, the detachment of the first terminal 46 from the case 16 can be suppressed as compared to the case where the first terminal 46 is received at three points by the case 16. Consequently, the durability of the terminal module 10 can be improved.

(4) The first engaging portions 70 are arranged on the first terminal end part 64. If the first engaging portions are arranged between the first terminal end part 64 and the guided portions 68, the first terminal 46 has an excessive length by a dimension between the first engaging portions 70 and the first terminal end part 64. Thus, the first terminal 46 can be reduced in size by arranging the first engaging portions 70 on the first terminal end part 64 as compared to the case where the first engaging portions 70 are arranged between the first terminal end part 64 and the guided portions 68. Therefore, the terminal module 10 can be reduced in size.

(5) The first terminal receiving portions 34 are arranged on the first extending portions 32 extending from the first base portions 30 toward the side opposite to the second divided wall portions 28. Thus, the worker can engage the second engaging portions 72 with the second terminal receiving portions 42 by rotating the first terminal 46 with respect to the case 16 after hooking the first engaging portions 70 to the first extending portions 32 from the side of the ceiling wall 20. Therefore, the assembly workability of the terminal module 10 can be improved.

(6) The second extending portions 40 on which the second terminal receiving portions 42 are arranged include the second inclined portions 44. The second terminal receiving portions 42 are arranged on a side closer to the ceiling wall 40 than the second inclined portions 44. The second inclined portions 44 are inclined to approach the first divided wall portions 26 toward the side opposite to the ceiling wall 20. The worker engages the second engaging portions 72 with the second terminal receiving portions 42 by rotating the first terminal 46 with respect to the case 16 after hooking the first terminal 46 to the first divided wall portions 26. The second inclined portions 44 suppress the second engaging portions 72 of the first terminal 46 from being caught by the second divided wall portions 28. Thus, the second inclined portions 44 make the second engaging portions 72 easily move around to the side closer to the ceiling wall 20 than the second terminal receiving portions 42. Therefore, the assembly workability of the terminal module 10 can be improved.

(7) The first engaging portions 70 are arranged on the first part 52, and the second engaging portions 72 are arranged on the second part 54. The second terminal receiving portions 42 of the case 16 are closer to the ceiling wall 20 than the first terminal receiving portions 34 of the case 16. Thus, when the first terminal 46 is attached to the case 16 by being rotated, the second engaging portions 72 of the first terminal 46 are more easily engaged with the second terminal receiving portions 42 of the case 16. Therefore, the assembly workability of the terminal module 10 can be improved.

(8) By being pressed by the mating terminal member 12, the first terminal 46 moves in a direction orthogonal to an arrangement direction of the first end part 14*a* of the coil spring 14 and the second end part 14*b* of the coil spring 14 and the facing direction of the pair of side walls 22, 22. The projecting portions 74 of the mating terminal member 12 relatively move with respect to the second surface 58 of the first terminal 46. Even if an external matter adheres to the second surface 58 of the first terminal 46 before the first terminal 46 and the mating terminal member 12 are electrically connected, the projecting portions 74 of the mating terminal member 12 can wipe and remove the external matter adhering to the second surface 58 of the first terminal 46. Thus, it is possible to suppress an increase in contact resistance between the first terminal 46 and the mating terminal member 12. Therefore, the electrical connection reliability of the terminal module 10 can be improved.

Other Embodiments

The above embodiment can be modified and carried out as follows. This embodiment and the following modifications can be carried out in combination without technically contradicting each other.

- The flexible conductor 50 may not be a braided wire. It is sufficient for the flexible conductor 50 to be flexible and repeatedly deformable according to a movement of the first terminal 46. The flexible conductor 50 may be, for example, a stranded wire formed by twisting a plurality of metal wires or an insulation coated wire including a stranded wire as a core wire. The flexible conductor 50 may be, for example, a thin plate laminated conductor in which a plurality of thin plate-like conductors are laminated.
- The first terminal 46 may not include the first and second parts 52, 54. That is, the first terminal 46 may be, for example, in the form of a flat plate by omitting the second part 54.
- The flexible conductor 50 may be joined to something other than the second surface 58 of the second part 54. The joining portion 55 may be, for example, joined to the first surface 56 of the first part 52. The joining portion 55 may be, for example, more distant from the ceiling wall 20 than the second engaging portions 72.

The terminal inclined portion 62 may be omitted.

The terminal inclined portion 62 may be provided on something other than the second terminal end part 66.

One, three or more guided portions 68 may be provided.

The guided portion 68 may project from something other than the side surface 60.

The guided portion 68 may be arranged on something other than the first part 52.

The guided portion 68 may be arranged other than between the first and second engaging portions 70, 72 in the front-rear direction.

When a plurality of the guided portions 68 are provided, the plurality of guided portions 68 may be provided at positions different from each other in the front-rear direction.

One, three or more first engaging portions 70 may be provided.

The first engaging portion 70 may project from something other than the side surface 60.

The first engaging portion 70 may be arranged on something other than the first part 52.

When a plurality of the first engaging portions 70 are provided, the plurality of first engaging portions 70 may be provided at positions different from each other in the front-rear direction.

One, three or more second engaging portions 72 may be provided.

The second engaging portion 72 may project from something other than the side surface 60.

The second engaging portion 72 may be arranged on something other than the second part 54.

When a plurality of the second engaging portions 72 are provided, the plurality of second engaging portions 72 may be provided at positions different from each other in the front-rear direction.

The projecting portions 74 may be omitted.

The projecting portions 74 may be provided not on the mating terminal member 12, but on the second surface 58 of the first terminal 46.

The first divided wall portion 26 may extend from something other than the lower end of the intermediate part of the side wall base portion 24 of the side wall 22.

The second divided wall portion 28 may extend from something other than the lower end of the rear end of the side wall base portion 24 of the side wall 22.

The first extending portion 32 may extend from something other than the lower end of the first base portion 30.

The first extending portions 32 may be omitted.

The first terminal receiving portion 34 may not be the upper end surface of the first extending portion 32. The first terminal receiving portion 34 can be freely arranged on the first divided wall portion 26 if being engageable with the first engaging portion 70 of the first terminal 46 pressed downward by the coil spring 14.

The second extending portion 40 may extend from something other than the lower end of the second base portion 38.

The second extending portions 40 may be omitted.

The second terminal receiving portion 42 may not be the upper end surface of the second extending portion 40. The second terminal receiving portion 42 can be freely arranged on the second divided wall portion 28 if being engageable with the second engaging portion 72 of the first terminal 46 pressed downward by the coil spring 14.

The first inclined portion 36 may guide the guided portion 68 of the first terminal 46 such that the guided portion 68 of the first terminal 46 at the second position is located upwardly and rearwardly of the guided portion 68 of the first terminal 46 at the first position.

The first inclined portion 36 may not be continuously inclined.

The first inclined portion 36 may not be provided over the entire region of the rear end surface of the first base portion 30. The first inclined portion 36 may be, for example, provided only in a region where the first inclined portion 36 can contact the guided portion 68 of the first terminal 46.

The first inclined portion 36 may not be the rear end surface of the first base portion 30. The first inclined portion 36 may be, for example, provided by bending a part of the first base portion 30 by press-working.

The first inclined portions 36 may be omitted. If the first inclined portions 36 are omitted, a structure for guiding the guided portions 68 may be, for example, provided in the unillustrated connector housing for accommodating the terminal module 10. That is, the structure for guiding the first terminal 46 from the first position to the second position when the first terminal 46 is pressed upward by the mating terminal member 12 may not necessarily be provided in the terminal module 10 itself.

LIST OF REFERENCE NUMERALS

10 terminal module
12 mating terminal member
14 coil spring
14*a* first end part
14*b* second end part
14*c* center axis
16 case
18 terminal member
20 ceiling wall
22 side wall
24 side wall base portion (base portion)
26 first divided wall portion
28 second divided wall portion
30 first base portion (first divided wall side base portion)
32 first extending portion (first divided wall side extending portion)
34 first terminal receiving portion
36 first inclined portion (first divided wall side inclined portion)
38 second base portion (second divided wall side base portion)
40 second extending portion (second divided wall side extending portion)
42 second terminal receiving portion
44 second inclined portion (second divided wall side inclined portion)
46 first terminal
48 second terminal
50 flexible conductor
52 first part
54 second part
55 joining portion
56 first surface
58 second surface

60 side surface

62 terminal inclined portion (first terminal side inclined portion)

64 first terminal end part (first terminal side first end part)

66 second terminal end part (first terminal side second end part)

68 guided portion

70 first engaging portion

72 second engaging portion

74 projecting portion

What is claimed is:

1. A terminal module electrically connectable to a mating terminal member, comprising:

a resiliently deformable coil spring;

a case for accommodating the coil spring; and a terminal member to be attached to the case, the coil spring including a first end part and a second end part arranged on a side opposite to the first end part, the case including a ceiling wall in contact with the first end part of the coil spring and a pair of side walls extending from the ceiling wall toward the second end part of the coil spring and facing each other, the terminal member including a first terminal to be attached to the pair of side walls and relatively movable with respect to the pair of side walls, each of the pair of side walls including a side wall base portion connected to the ceiling wall, a first divided wall portion connected to the side wall base portion, and a second divided wall portion connected to the side wall base portion and separated from the first divided wall portion, the first divided wall portion including a first terminal receiving portion capable of receiving the first terminal pressed by the coil spring, the second divided wall portion including a second terminal receiving portion capable of receiving the first terminal pressed by the coil spring, the first terminal including a first surface to be pressed by the second end part of the coil spring, a second surface arranged on a side opposite to the first surface, a guided portion slidable with respect to the first divided wall portion, a first engaging portion engageable with the first divided wall portion, and a second engaging portion engageable with the second divided wall portion, the entire first divided wall portions provided in the pair of respective side walls being parallel to each other with the first terminal interposed therebetween and extending at a first lower end thereof in a direction parallel to the side wall base portions, the entire second divided wall portions provided in the pair of respective side walls being parallel to each other with the first terminal interposed therebetween and extending at a second lower end thereof in the direction parallel to the side wall base portions, the first terminal being capable of reversibly taking a first position and a second position different from the first position, and at the first position, the first surface being pressed by the coil spring, the guided portion being arranged between the first and second divided wall portions, the first engaging portion being engaged with the first terminal receiving portion and the second engaging portion being engaged with the second terminal receiving portion.

2. The terminal module of claim 1, wherein:

the first terminal includes a pair of side surfaces at least partially facing the pair of side walls of the case, the guided portion projects from the pair of side surfaces, the first engaging portion projects from the pair of side surfaces, and the second engaging portion projects from the pair of side surfaces.

3. The terminal module of claim 2, wherein:

the first engaging portions project from the pair of respective side surfaces, and the second engaging portions project from the pair of respective side surfaces.

4. The terminal module of claim 1, wherein:

the first terminal includes a first terminal end part arranged closer to the guided portion than to the second engaging portion, and the first engaging portion is arranged on the first terminal end part.

5. The terminal module of claim 1, wherein:

the first divided wall portion includes a first base portion connected to the side wall base portion and a first extending portion extending from the first base portion toward a side opposite to the second divided wall portion, the first terminal receiving portion is arranged on the first extending portion, and the first engaging portion is engaged with the first terminal receiving portion from the side of the ceiling wall.

6. The terminal module of claim 1, wherein:

the second divided wall portion includes a second base portion connected to the side wall base portion and a second extending portion extending from the second base portion toward a side opposite to the first divided wall portion, the second terminal receiving portion is arranged on the second extending portion, the second extending portion includes a second inclined portion inclined to approach the first divided wall portion toward a side opposite to the ceiling wall, and the second terminal receiving portion is closer to the ceiling wall than the second inclined portion.

7. The terminal module of claim 1, wherein:

the first terminal includes a first part to be brought into contact with the second end part of the coil spring and a second part connected to the first part and extending toward the ceiling wall of the case, the first engaging portion is arranged on the first part, the second engaging portion is arranged on the second part, and the second terminal receiving portion is closer to the ceiling wall than the first terminal receiving portion.

8. The terminal module of claim 1, wherein:

the first terminal at the first position is capable of taking the second position by the second surface being pressed by a projecting portion provided on the mating terminal member and the guided portion of the first terminal sliding on the first divided wall portion of the case, and a position of the guided portion at the second position is closer to the ceiling wall and closer to the second terminal receiving portion in a direction orthogonal to an arrangement direction of the first end part of the coil spring and the second end part of the coil spring and a facing direction of the pair of side walls than that of the guided portion at the first position.

* * * * *